US008339623B2

(12) United States Patent
Kato et al.

(10) Patent No.: US 8,339,623 B2
(45) Date of Patent: Dec. 25, 2012

(54) PAPER DOCUMENT PROCESSING APPARATUS, PAPER DOCUMENT PROCESSING METHOD, AND COMPUTER READABLE MEDIUM

(75) Inventors: Masahiro Kato, Kanagawa (JP); Katsuhiko Itonori, Kanagawa (JP); Daisuke Tatsumi, Kanagawa (JP); Yuya Konno, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1009 days.

(21) Appl. No.: 12/210,727

(22) Filed: Sep. 15, 2008

(65) Prior Publication Data
US 2009/0219556 A1    Sep. 3, 2009

(30) Foreign Application Priority Data

Feb. 29, 2008 (JP) ................................. 2008-050495

(51) Int. Cl.
*G06F 3/12* (2006.01)
(52) U.S. Cl. .................. 358/1.13; 707/101; 382/101
(58) Field of Classification Search ............... 358/1.13, 358/1.14, 2.1, 448, 1.16, 442, 1.1, 1.17, 435, 358/434; 382/292, 187, 224, 214, 219; 399/82; 707/101
See application file for complete search history.

(56) References Cited

U.S. PATENT DOCUMENTS

| | | | | |
|---|---|---|---|---|
| 5,247,371 A | * | 9/1993 | Hikawa et al. | 358/448 |
| 5,337,406 A | * | 8/1994 | Takakura et al. | 715/202 |
| 5,519,852 A | * | 5/1996 | Noy | 703/27 |
| 5,546,577 A | * | 8/1996 | Marlin et al. | 1/1 |
| 5,576,849 A | * | 11/1996 | Murakami et al. | 358/2.1 |
| 5,659,845 A | * | 8/1997 | Krist et al. | 399/79 |
| 5,680,615 A | * | 10/1997 | Marlin et al. | 1/1 |
| 5,745,883 A | * | 4/1998 | Krist et al. | 705/34 |
| 5,752,020 A | * | 5/1998 | Ando | 1/1 |
| 5,758,074 A | * | 5/1998 | Marlin et al. | 709/250 |
| 5,778,377 A | * | 7/1998 | Marlin et al. | 1/1 |
| 5,812,664 A | * | 9/1998 | Bernobich et al. | 380/278 |
| 5,835,922 A | * | 11/1998 | Shima et al. | 715/209 |

(Continued)

FOREIGN PATENT DOCUMENTS
JP    A-8-272883    10/1996
(Continued)

OTHER PUBLICATIONS

Mar. 23, 2010 Office Action issued in Japanese Patent Application No. 2008-050495 (with translation).

*Primary Examiner* — Marivelisse Santiago Cordero
*Assistant Examiner* — Moustapha Diaby
(74) *Attorney, Agent, or Firm* — Oliff & Berridge, PLC

(57) ABSTRACT

A paper document processing apparatus includes: a document image acceptance unit that accepts an image acquired; a document image recording unit that records a document image in a storage; an attribute information acquisition unit that acquires attribute information based on the document image; an acquisition result evaluation unit that evaluates whether an acquisition result of the acquired attribute information is affirmative or negative; a medium output unit that outputs information indicating a scan status of the paper document that is formed on a medium while specifying the document image for which the acquisition result of attribute information is evaluated negative; a medium acceptance unit that accepts the information formed on the medium; and an attribute information reacquisition unit that reacquires the attribute information of the document image by specifying the document image in accordance with the accepted information.

11 Claims, 6 Drawing Sheets

U.S. PATENT DOCUMENTS

| | | | | |
|---|---|---|---|---|
| 5,838,458 A * | 11/1998 | Tsai | | 358/402 |
| 5,845,304 A * | 12/1998 | Iijima | | 715/234 |
| 5,848,430 A * | 12/1998 | Takakura et al. | | 715/202 |
| 5,974,150 A * | 10/1999 | Kaish et al. | | 713/179 |
| 5,987,176 A * | 11/1999 | Imaizumi et al. | | 382/232 |
| 6,003,033 A * | 12/1999 | Amano et al. | | 1/1 |
| 6,014,677 A * | 1/2000 | Hayashi et al. | | 707/781 |
| 6,111,654 A * | 8/2000 | Cartier et al. | | 358/1.16 |
| 6,123,258 A * | 9/2000 | Iida | | 235/375 |
| 6,166,823 A * | 12/2000 | Fujii et al. | | 358/1.14 |
| 6,175,839 B1 * | 1/2001 | Takao et al. | | 715/205 |
| 6,199,071 B1 * | 3/2001 | Nielsen | | 1/1 |
| 6,233,592 B1 * | 5/2001 | Schnelle et al. | | 715/205 |
| 6,243,501 B1 * | 6/2001 | Jamali | | 382/305 |
| 6,281,986 B1 * | 8/2001 | Form | | 358/403 |
| 6,325,420 B1 | 12/2001 | Zhang et al. | | |
| 6,354,630 B1 | 3/2002 | Zhang et al. | | |
| 6,396,598 B1 * | 5/2002 | Kashiwagi et al. | | 358/474 |
| 6,466,694 B2 * | 10/2002 | Kamada et al. | | 382/181 |
| 6,982,806 B2 * | 1/2006 | Yoshida | | 358/1.15 |
| 7,035,463 B1 * | 4/2006 | Monobe et al. | | 382/177 |
| 7,236,984 B2 * | 6/2007 | Ohashi | | 1/1 |
| 7,246,748 B1 * | 7/2007 | Feuerman et al. | | 235/462.09 |
| 7,268,909 B2 * | 9/2007 | Nakagiri | | 358/1.16 |
| 7,327,485 B2 * | 2/2008 | Silverbrook et al. | | 358/1.15 |
| 7,428,067 B2 * | 9/2008 | Kiwada | | 358/1.14 |
| 7,448,550 B1 * | 11/2008 | Feuerman et al. | | 235/462.07 |
| 7,450,253 B2 * | 11/2008 | Kiwada | | 358/1.14 |
| 7,508,547 B2 * | 3/2009 | Nishikawa et al. | | 358/2.1 |
| 7,522,296 B2 * | 4/2009 | Ozawa et al. | | 358/1.13 |
| 7,593,120 B2 * | 9/2009 | Kitora et al. | | 358/1.13 |
| 7,653,217 B2 * | 1/2010 | Ikegawa | | 382/112 |
| 7,677,820 B2 * | 3/2010 | Ohashi | | 400/62 |
| 7,717,340 B1 * | 5/2010 | Feuerman et al. | | 235/462.07 |
| 7,733,545 B2 * | 6/2010 | Sakakibara et al. | | 358/518 |
| 7,747,036 B2 * | 6/2010 | Kashioka | | 382/100 |
| 7,760,386 B2 * | 7/2010 | Silverbrook et al. | | 358/1.15 |
| 7,761,326 B2 * | 7/2010 | Miyaoku et al. | | 705/14.39 |
| 7,826,101 B2 * | 11/2010 | Yano et al. | | 358/403 |
| 2005/0025340 A1 * | 2/2005 | Hickman | | 382/101 |
| 2005/0249376 A1 * | 11/2005 | Leo et al. | | 382/101 |
| 2006/0053137 A1 * | 3/2006 | Tanimoto | | 707/101 |

FOREIGN PATENT DOCUMENTS

| | | |
|---|---|---|
| JP | A-2002-522853 | 7/2002 |
| JP | A-2003-274080 | 9/2003 |
| JP | A-2004-265125 | 9/2004 |
| JP | A-2007-41709 | 2/2007 |
| JP | A-2007-196129 | 8/2007 |
| WO | WO 00/10137 A1 | 2/2000 |

* cited by examiner

PAPER DOCUMENT PROCESSING APPARATUS, PAPER DOCUMENT PROCESSING METHOD, AND COMPUTER READABLE MEDIUM

CROSS-REFERENCE TO RELATED APPLICATIONS

This application is based on and claims priority under 35 U.S.C. 119 from Japanese Patent Application No. 2008-050495 filed Feb. 29, 2008.

BACKGROUND

1. Technical Field

The present invention relates to a paper document processing apparatus, a paper document processing method, and a computer readable medium, and more particularly to supporting a confirmation operation of the user through a process for reading the images of various kinds of paper documents existing in large quantities.

2. Related Art

Various kinds of paper documents existing in large quantities are scanned by a copying machine to acquire the attribute information such as the papers number or date described on the paper documents through an OCR (Optical Character Recognition) process, as well as acquiring the document images, in which an operation for confirming the scanned image by visual inspection is generally performed for the paper document that fails in acquiring the attribute information, using a display on another terminal such as a PC, for example.

SUMMARY

According to an aspect of the present invention, a paper document processing apparatus including: a document image acceptance unit that accepts an image acquired by scanning a document described on a paper document as a document image; a document image recording unit that records the document image in a storage; an attribute information acquisition unit that acquires attribute information described on the paper document based on the document image; an acquisition result evaluation unit that evaluates whether an acquisition result of attribute information by the attribute information acquisition unit is affirmative or negative; a medium output unit that outputs information indicating a scan status of the paper document that is formed on a medium while specifying the document image for which the acquisition result of attribute information is evaluated negative by the acquisition result evaluation unit; a medium acceptance unit that accepts the information formed on the medium by scanning the medium; and an attribute information reacquisition unit that reacquires the attribute information of the document image by specifying the document image in accordance with the information accepted by the medium acceptance unit.

BRIEF DESCRIPTION OF THE DRAWINGS

Exemplary embodiment of the present invention will be described in detail based on the following figures, wherein.

DETAILED DESCRIPTION

The preferred embodiments of the present invention will be described below with reference to the drawings.

Figure 1:
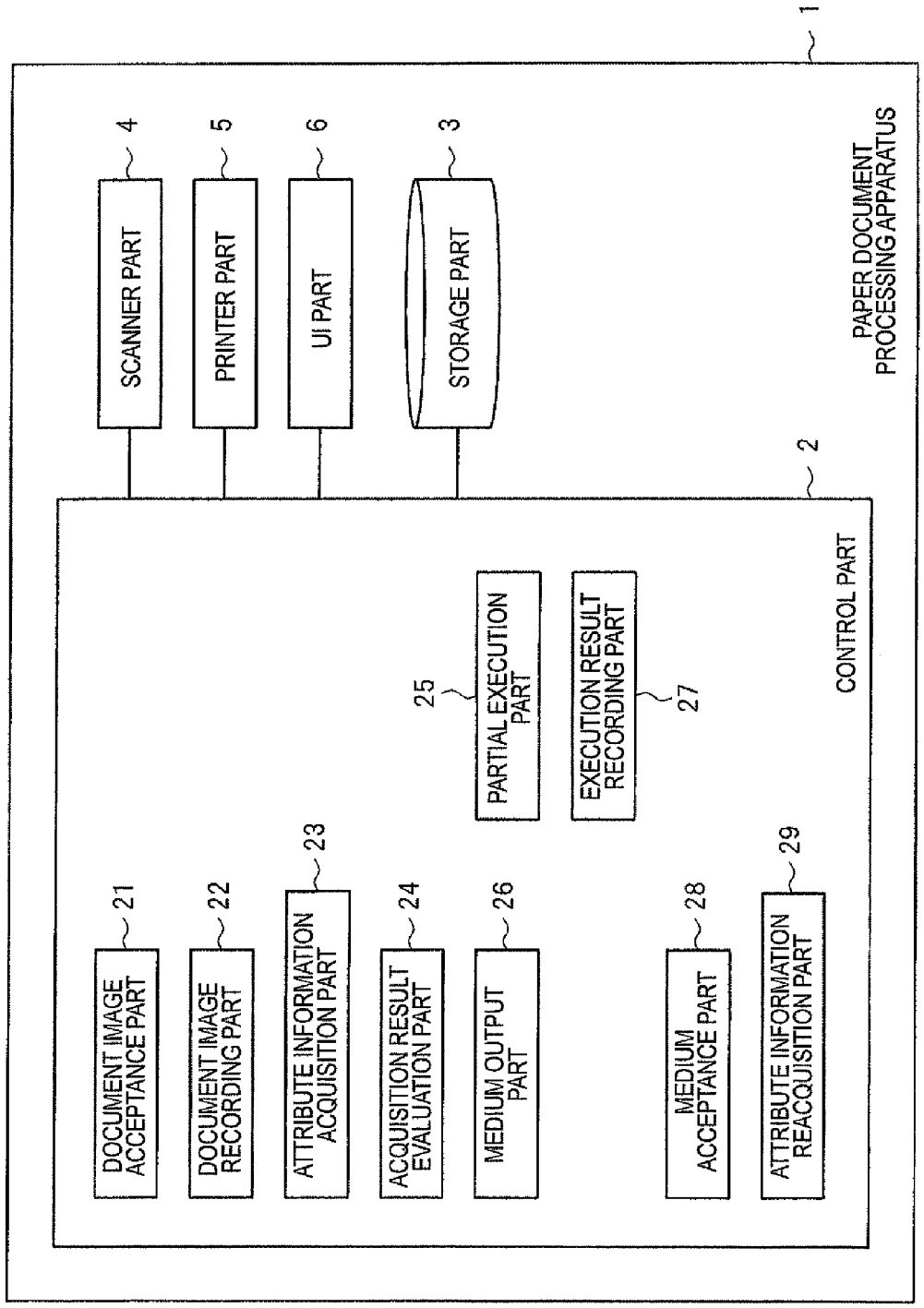
FIG. 1 is a block diagram showing an example of functional blocks representing the functions implemented by a paper document processing apparatus according to an embodiment of the invention.

FIG. 1 is a block diagram showing a hardware configuration and a functional configuration of a paper document processing apparatus 1 according to an embodiment of the invention. Herein, the paper document processing apparatus 1 is mounted on a multi-function device having a copy function, a print function and a scan function, for example. This multi-function device is generally called an MFP (Multi Function Peripheral). The user of the paper document processing apparatus 1 according to this embodiment instructs the paper document processing apparatus 1 to perform an operation for acquiring various attribute information from the paper document by scanning various kinds of paper documents existing in large quantities.

Figure 6A:
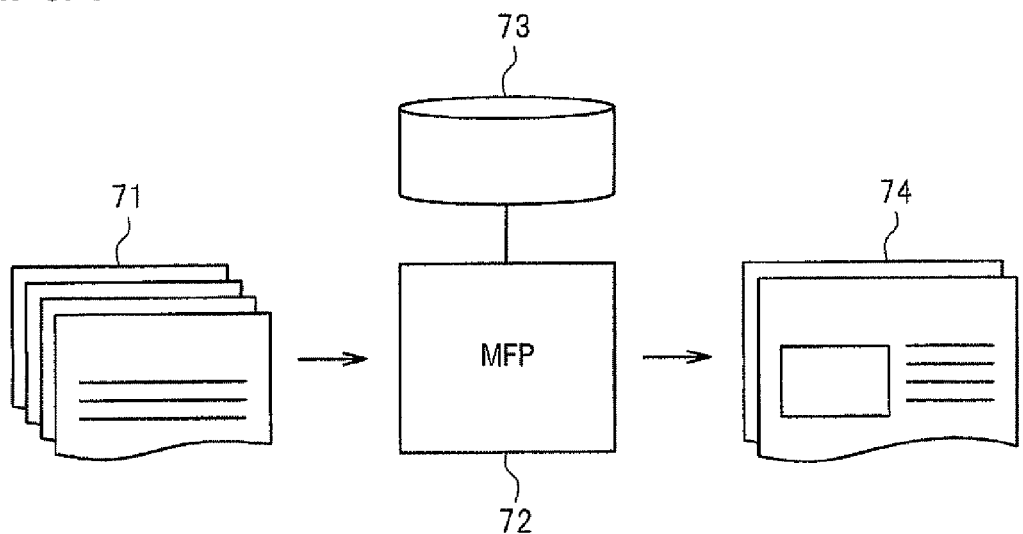
FIG. 6 is a view for conceptually explaining an operation for acquiring the attribute information by the user of an MFT according to the embodiment.
Figure 6B:
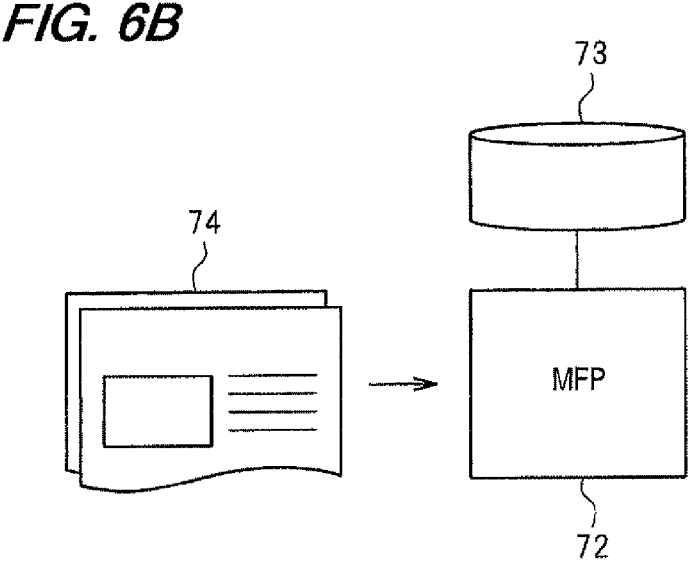

FIG. 6 is a view for conceptually explaining an operation for acquiring the attribute information according to the embodiment. The user instructs an MFP 72 to scan the paper documents 71 existing in large quantities successively, as shown in FIG. 6A. And the MFP 72 acquires the attribute information described on each paper document, and stores the attribute information in a storage part 73 connected to the MFP 72. Especially if the attribute information described on the paper document can not be read due to bending of paper in scanning, for example, the MFP 72 specifies the paper document, and outputs information indicating its scan status onto a reacquisition support sheet 74 of a predetermined sheet-like image recording medium. After scanning the paper documents 71 successively, the user instructs the MFP 72 to read the outputted reacquisition support sheet 74, as shown in FIG. 6B. In the MFP 72 that reads the reacquisition support sheet 74, a program for supporting the user to perform an operation of confirming the attribute information is started, and the user instructs the MFP 72 to reacquire the attribute information and accumulate it in the storage part 73, while confirming the information outputted on the reacquisition support sheet.

The paper document processing apparatus 1 comprises a control part 2, a storage part 3, a scanner part 4, a printer part 5, and a UI part 6. The paper document processing apparatus 1 of this embodiment is mounted on the hardware such as a stationary copying machine, for example, whereby various functions of the paper document processing apparatus 1 can be implemented by the user's operation.

The control part 2 is a program control device such as a CPU (Central Processing Unit). The control part 2 comprises the functional blocks of a document image acceptance part 21, a document image recording part 22, an attribute information acquisition part 23, an acquisition result evaluation part 24, a partial execution part 25, a medium output part 26, an execution result recording part 27, a medium acceptance part 28, and an attribute information reacquisition part 29, in which each function is implemented by executing a program according to the embodiment of the invention. This program may be stored and provided in various kinds of computer readable information storage medium such as a CD-ROM or DVD-ROM, or distributed via communication means such as internet. The details of each function will be described later.

The storage part 3 is composed of a memory device such as a RAM (Random Access Memory) or a ROM (Read Only Memory) or a hard disk. This storage part 3 stores the program (software) executed by the control part 2. Also, this storage part 3 operates as a work memory holding various kinds of data for use in the process of the control part 2.

The scanner part 4 comprises an image scanner. This scanner part 4 reads the image described on the sheet-like image recording medium such as paper or synthetic resin film as image data in accordance with an instruction inputted from the control part 2. In this embodiment, the document described on the paper document is read as the document image, and outputted to the control part 2. This document image is, for example, image data in a bit map format in which the document including text, line-work or photo is represented.

The printer part 5 comprises an output device such as a laser printer or an ink jet printer. This printer part 5 forms the image based on image data inputted from the control part 2 on the sheet-like image recording medium such as paper or synthetic resin film, for example, in accordance with an instruction inputted from the control part 2.

The UI part 6 comprises a touch panel, a liquid crystal display and an input device (keyboard, mouse, touch panel, etc.). This UI part 6 displays a screen (e.g., a menu screen that prompts the user to input an instruction) based on data inputted from the control part 2 in accordance with an instruction inputted from the control part 2. Also, the UI part 6 accepts the input of the instruction from the user and outputs the input contents to the control part 2.

Herein, in the operation for the user of the paper document processing apparatus 1 to scan various kinds of paper documents existing in large quantities and acquire various attribute information of those paper documents, the details of the function implemented by each functional block included in the control part 2 will be described below. As the premise for each functional block to function, first of all, the user initializes the paper document processing apparatus 1. The paper document processing apparatus 1 automatically performs a scan process for reading large amounts of paper documents as the images with this initialization.

The document image acceptance part 21 reads the document image by scanning the document described on the paper document through the scan process in the scanner part 4. The document image acceptance part 21 accepts the document image of image data by performing the scan process in the scanner part 4, every time the paper document is supplied to the scanner part 4.

The document image recording part 22 records the document image accepted by the document image acceptance part 21 in the storage part 3. The document image recording part 22 records the document image in the storage part 3, every time the document image acceptance part 21 accepts the document image. Also, the document image recording part 22 records the document image associated with the identification information of the document image.

Then, the attribute information acquisition part 23 generates the attribute information from the document image recorded by the document image recording part 22, and acquires the attribute information by recording the generated attribute information associated with the identification information of the document image in the storage part 3. Herein, since the attribute information is associated with the identification information, the attribute information is associated with the document image associated with the identification information. Also, this attribute information is the "creation date", "creator", "creation number" and so on of the paper document, for example, and may be the information indicating the property or feature of the paper document or the information for classifying the paper documents. The attribute information is described in various layouts in accordance with the kind of paper document. A process for the attribute information acquisition part 23 to read the attribute information from the document image is performed by recognizing the character described on the paper document mainly through an OCR process. In the following, the contents of a process (first recognition process) for the attribute information acquisition part 23 to generate the attribute information will be further specifically described below.

First of all, the attribute information acquisition part 23 performs a process for limiting the amount of information displayed by the document image (hereinafter, referred to as a first image process), such as limiting the number of gradations used for the document image through a binarization process, or limiting the display of pixels through a filter for removing the isolated point, for example, for the document image. Through this first image process, the processing speed of the OCR process by the attribute information acquisition part 23 is enhanced.

Then, the attribute information acquisition part 23 identifies the layout of the document image from the document image (hereinafter, first image) subjected to the first image process. Herein, the layout is the information designating the area where the text, line-work or photo described on the paper document exists, and identified from the arrangement of character string and the ruled line in the document image. Also, the information indicating the kind of paper document corresponding to the layout of the paper document and the name of attribute information that each kind of paper document has are recorded in the storage part 3. The attribute information acquisition part 23 identifies the layout of the document image, and extracts the area where the character string exists in the document image to recognize the character string in the extracted area. And if this recognized character string is the name of attribute information provided for the paper document of the kind corresponding to the identified layout, the attribute information acquisition part 23 judges the area where the attribute information is described, starting from the area where the name of attribute information exists. This area where the attribute information is described is, for example, the area partitioned by the ruled line surrounding the area where the name of attribute information exists. And the attribute information acquisition part 23 recognizes the attribute information from the area where the attribute information is described. In this way, the attribute information acquisition part 23 generates the attribute information from the document image, and records the attribute information associated with the identification information in the storage part 3. The attribute information acquisition part 23 records the character string "unrecognizable" associated with the identification information of the document image in the storage part 3, if the character string corresponding to the name of attribute information can not be recognized from the document image, or the character string does not exist in the area where the attribute information is described.

The information of coordinates in the paper document indicating the area where the attribute information is described may be further recorded associated with the kind of the paper document corresponding to the layout in the storage part 3. In this case, the attribute information acquisition part 23 identifies the layout of the document image, and generates the attribute information in accordance with the information of coordinates associated with the kind of paper document corresponding to the identified layout.

The acquisition result evaluation part 24 evaluates whether the acquisition result of the attribute information represented in the document image by the attribute information acquisition part 23 is affirmative or negative. Herein, whether the evaluation of the acquisition result evaluation part 24 is affirmative or negative depends on the presence or absence of the character string indicating the attribute information that the attribute information acquisition part 23 records associated with the document image in the storage part 3, or its correctness or incorrectness. More specifically, for example, when the attribute information acquisition part 23 acquires the attribute information of "creation date", the evaluation of the acquisition result of attribute information by the acquisition result evaluation part 24 is negative, if the creation date contains irrelevant character string such as "January 23A", the character string does not indicate the creation date such as "500 yen", or the character string is out of the predetermined range of the information indicating the date such as "February 31". Also, when the character string of "creation date" corresponding to the name of attribute information can not be recognized from the document image, or when the character string does not exist in the area where the attribute information is described, the acquisition result is evaluated as negative. Further, when the attribute information acquisition part 23 can not identify the layout and the kind of paper document is unknown, such as when the paper document has a large fold, the acquisition result evaluation part 24 evaluates the acquisition result to be negative, because the attribute information described on the paper document is unknown. On the other hand, when the character string indicating the date such as "January 23" or "January 23 (in Chinese character)" is acquired, the acquisition result acquisition part 24 evaluates the acquisition result of attribute information to be affirmative.

Term "Affirmative" means a state where a relationship between an item name of the attribute information and an attribute value of corresponding to the item name is inconsistent. Further, term "negative" means a state where a relationship between an item name of the attribute information and an attribute value of corresponding to the item name is consistent.

Herein, when the acquisition result evaluation part 24 evaluates the acquisition result of attribute information represented in the document image to be negative, each of the partial execution part 25 and the medium output part 26 performs the respective processing. First of all, a process performed by the partial execution part 25 will be described below.

The partial execution part 25 performs at least part of a recognition process (hereinafter, second recognition process) different from the first recognition process to acquire the attribute information of the document image again for the document image in which the acquisition result evaluation part 24 evaluates the acquisition result of attribute information to be negative. The partial execution part 25 performs an image process (hereinafter, second image process) for correcting the shape of character string indicating the described attribute information as a part of this second recognition process for the document image evaluated as negative. Through this second image process, the recognition ratio of character string indicating the attribute information represented in the document image is improved. Herein, the second image process includes a skew correction process for correcting a slight inclination of document image, a process for separating the character contact with the ruled line from the ruled line in the document image, a process for scaling up the character to the size suitable for the OCR process while maintaining the smoothness of the contour of small character, a process for smoothing the character contour line by removing irregularities of one dot level on the contour line of character, and a floating binarization process for making the binarization using two or more thresholds by locally deciding them in the area where the character exists, for example. The second image process may be performed for the document image or the first image.

Also, the second recognition process may judge the area where the attribute information is described, and perform the second image process for only this area to recognize the attribute information, or may perform the second image process for the entire document image and judge the area where the attribute information is described to recognize the attribute information. The control part 2 performs the second recognition process to generate the attribute information from the document image. The partial execution part 25 in this embodiment performs the second image process for the document image as a part of the second recognition process, but may perform all of the second image process for the document image. Also, the second recognition process in this embodiment is different in the image process for the document image from the first recognition process, but may be different in the OCR process for recognizing the character string of attribute information from the first recognition process.

The execution result recording part 27 records the document image (hereinafter, second image) subjected to the second image process, which is the result of performing a part of the second recognition process by the partial execution part 25, in the storage part 3. Also, this second image is recorded associated with the identification information of the document image.

In addition, a difference between the first recognition process and the second recognition process is summarized as follows.

The first recognition process is to recognize the attribute information after the process for limiting the amount of information displayed by the document image is only performed. Further, the second recognition process is to recognize the attribute information after at least one of the process for correcting the information displayed by the document image is performed.

A process of the medium output part 26 will be described below.

Particularly, the medium output part 26 specifies the document image for which the acquisition result of the attribute information by the acquisition result evaluation part 24 is evaluated as negative, and forms the image indicating the scan status of the paper document on which the document of the document image is described on a reacquisition support sheet for output. On the reacquisition support sheet of this embodiment, the image including a QR code as the identification information for specifying the document image for which the acquisition result of the attribute information is negative and the second image are formed. The medium output part 26 outputs the reacquisition support sheet to the printer part 5. Though in this embodiment, the information formed on the reacquisition sheet includes the QR code, the information may be a bar code or ID information of the paper document, or the document image may be specified by the second image.

The user of the paper document processing apparatus 1 can confirm whether the paper document is normally scanned or not, or whether the paper document is folded and scanned or not by perusing the second image formed on the reacquisition support sheet. Though in this embodiment, the second image as the information indicating the scan status is formed on the reacquisition support sheet, the information indicating the scan status may not be the second image, but may be the document image read from the paper document by the scanner part 4, or the first image. For the second image for which the process for improving the recognition ratio of the attribute information is performed, the attribute information is easily confirmed by visual inspection of the user, whereby the medium output part 26 of this embodiment forms the second image on the reacquisition support sheet. The second image formed on the reacquisition support sheet indicates the result of executing at least a part of the second recognition process by the partial execution part 25. Also, a plurality of images composed of the second image and the QR code may be formed on one reacquisition support sheet, or one image may be formed. In the latter case, the reacquisition support sheet is printed out by the number of paper documents where the not acquired attribute information exists.

In the above way, if various kinds of paper documents existing in large quantities are all scanned, and accepted as the document images, the reacquisition support sheet that specifies the document image where the not acquired attribute information exists is outputted by the medium output part 26. In the following, a process for reacquiring the attribute information in which the user instructs the paper document processing apparatus 1 to read the reacquisition support sheet outputted in the above way will be described below. As the premise for this process, for example, if the scanner part 4 scans the reacquisition support sheet, a predetermined program recorded in the storage part 3 is started, and the touch panel in the UI part 6 is changed to the display that prompts the user to confirm the attribute information. The user makes the input for confirming the attribute information while referring to the second image formed on the reacquisition support sheet, or re-inputs the attribute information, whereby the paper document processing apparatus 1 reacquires the attribute information.

First of all, the medium acceptance part 28 reads the image formed on the reacquisition support sheet in the scanner part 4, specifies the document image for which the acquisition result of the attribute information by the acquisition result evaluation part 24 is negative, and accepts the information indicating the scan status.

And the attribute information reacquisition part 29 firstly specifies the document image with the identification information indicated in the QR code of the reacquisition support sheet, and prompts the user to confirm the attribute information associated with the specified document image to acquire the attribute information again. More specifically, the attribute information reacquisition part 29 calls the second image that the execution result recording part 27 records in the storage part 3 according to the identification information indicated on the reacquisition support sheet, extracts the area where the attribute information is described from this second image, and recognizes the attribute information through the OCR process. And the attribute information reacquisition part 29 displays the attribute information generated from the second image on the UI part 6. The user judges whether the attribute information displayed on the UI part 6 is correct or not while confirming the second image formed on the reacquisition support sheet. The user, if judging that the attribute information is correct, makes the input for confirmation on the UI part 6, or if judging that the attribute information is incorrect, makes the input for modifying the attribute information on the UP part 6. The attribute information reacquisition part 29 accepts the attribute information inputted by the user, and records it associated with the identification information of the document image in the storage part 3 to acquire the attribute information again.

The document image may be displayed in reduction on the touch panel of the UI part 6. The document image displayed on the touch panel may be the document image read from the paper document by the scanner part 4, or the first image or the second image, or may or may not be the same image as the reacquisition support sheet.

When the user can not recognize the attribute information from the document image formed on the reacquisition support sheet, such as when the scanner part 4 performs the scan process for the folded paper document, the UI part 6 may accept the input of the user to cancel the document image recorded in the storage part 3. In this case, the user instructs the paper document processing apparatus 1 to re-scan the paper document on which the canceled document image is formed to acquire the attribute information.

Figure 2:
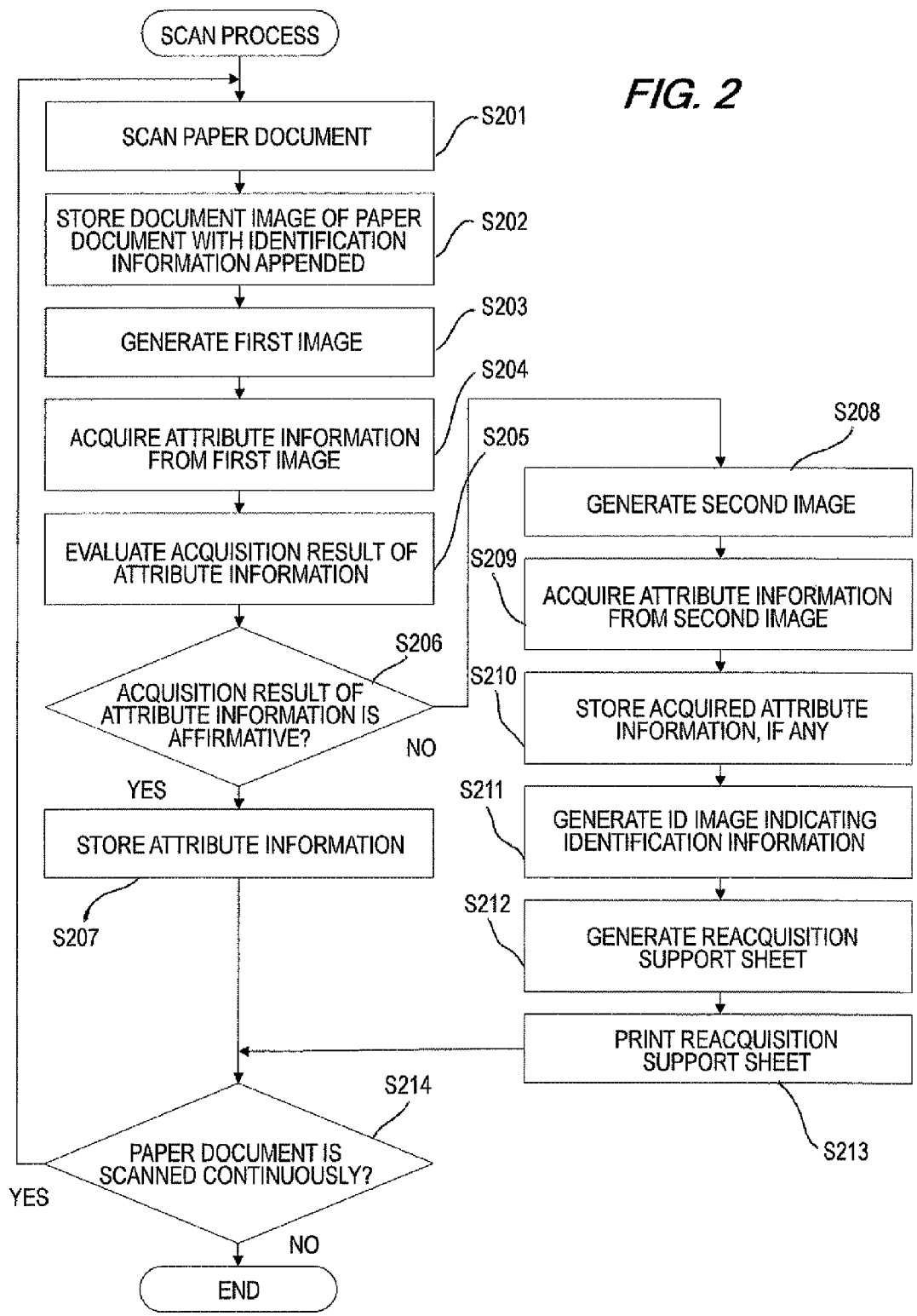
FIG. 2 is a flowchart showing an example of the flow of a scan process for scanning various kinds of paper documents existing in large quantities to issue a reacquisition support sheet.

FIG. 2 is a flowchart showing an example of the flow of a scan process for scanning various kinds of paper documents existing in large quantities to issue the reacquisition support sheet. First of all, the control part 2 controls the scanner part 4 to scan the paper document to acquire the document image (S201). Then, the control part 2 appends the identification information to the document image obtained by scanning the paper document and stores the document image and the identification image (S202). And the control part 2 generates the first image by performing the first image process for binarizing the stored document image (S203). Further, the control part 2 generates and acquires the attribute information from the document image by reading the attribute information from the first image (S204). In this process for generating the attribute information, first of all, the control part 2 generates the first image, and identifies the layout from this first image to identify the kind of document. And the control part 2 extracts the area where the attribute information is described from the first image, and recognizes the attribute information from the area through the OCR process to acquire the attribute information.

At S205, the control part 2 evaluates whether the acquisition result of the attribute information is affirmative or not. And at S206, the control part 2 judges whether the acquisition result of the attribute information is affirmative or negative. If the acquisition result is affirmative (YES), the acquired attribute information is stored associated with the identification information in the storage part 3 (S207). On the other hand, if the acquisition result is negative (NO) at S206, the control part 2 generates the second image by performing the second image process such as a skew correction process for the document image (S208). And at S209, the control part 2 acquires the attribute information from the second image in the same way as S204. If the attribute information can be acquired from the second image at S209, the control part 2 stores the attribute information associated with the identification information in the storage part 3 (S210). At S211, the control part 2 generates the ID image such as the QE code indicating the identification information of the document image. At S212, the image formed on the reacquisition support sheet is generated from the ID image at S211 and the second image at S208. And at S213, the control part 2 controls the printer part 5 to output the reacquisition support sheet. After the processing at S207 and S213, the control part 2 judged whether or not the paper document is scanned continuously at S214. If all the paper documents existing in large quantities are scanned to store the attribute information or print the reacquisition support sheet for each document image (NO), this scan process involving issuing the reacquisition support sheet is ended. On the other hand, if the paper document to be scanned remains (YES), the paper document is scanned continuously (S201).

Figure 3:
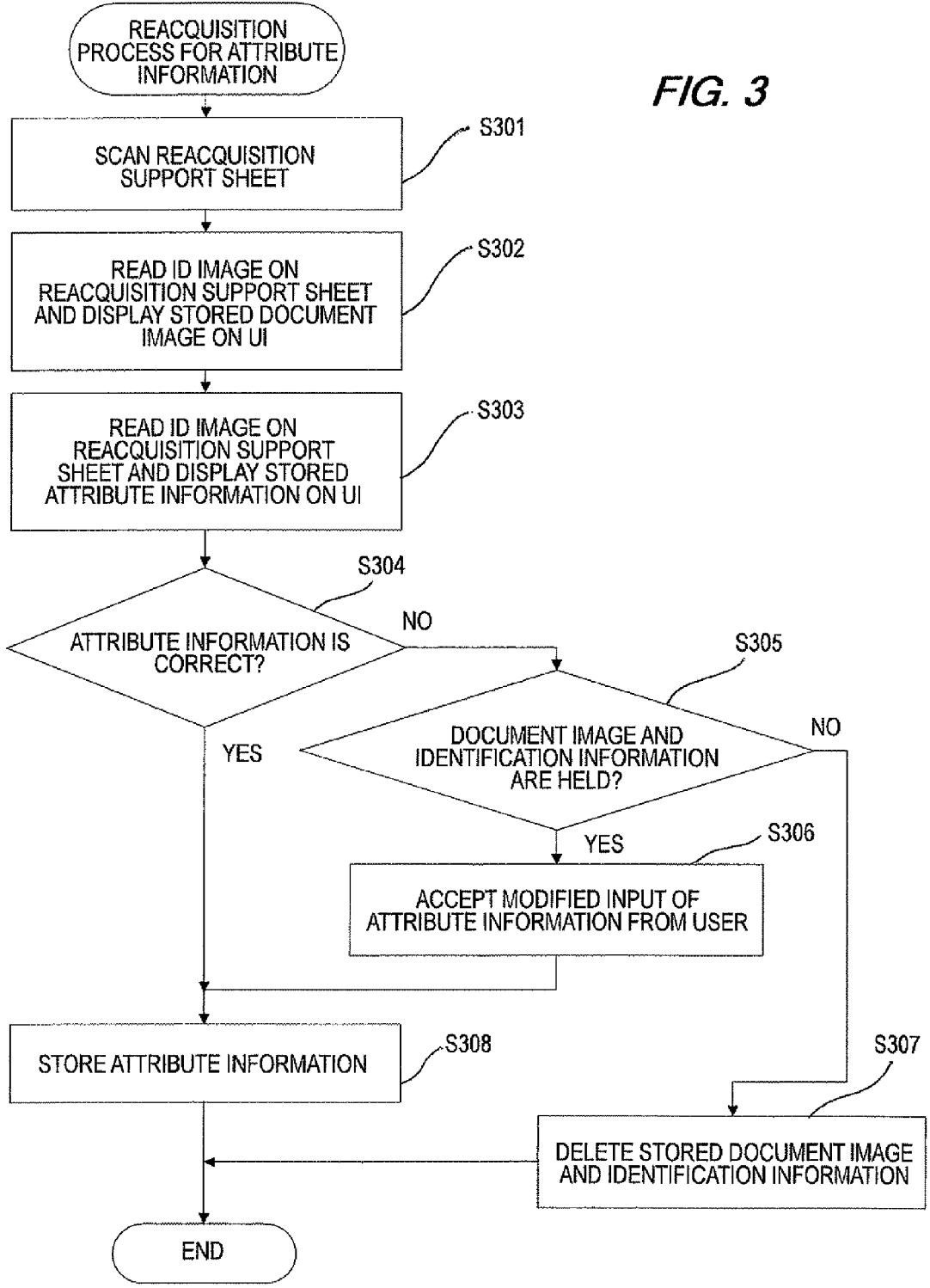
FIG. 3 is a flowchart showing an example of the flow of a re-input acceptance process for enabling the user to re-input the attribute information in accordance with the issued reacquisition support sheet.

FIG. 3 is a flowchart showing an example of the flow of a process for re-acquiring the attribute information in accordance with the issued reacquisition support sheet. FIG. 3 is the flow in the case where the scan status for one paper document is indicated on one reacquisition support sheet, and the information specifying the document image is carried thereon. First of all, the user sets the reacquisition support sheet on the scanner part 4, and the control part 2 controls the scanner part 4 to read the reacquisition support sheet (S301). At S302, the control part 2 reads the identification information from the ID image described on the reacquisition support sheet, and inquires the document image associated with the identification information from the storage part 3 to display it on the UI part 6. At S303, the attribute information associated with the document image is likewise displayed on the UI part 6 in accordance with the identification information indicated by the ID image. And the user confirms the attribute information in accordance with the display on the UI part 6 and the image of the reacquisition support sheet (S304). If the user judges the image of the reacquisition support sheet to be correct by visual inspection for the attribute information displayed on the UI part 6 (YES), the control part 2 accepts the confirmation input by the user, and stores the attribute information associated with the identification information (S308).

On the other hand, if the user judges the attribute information displayed on the UI part 6 to be incorrect by visual inspection (NO), the control part 2 directs the user to judge whether or not the document image and the identification information are stored in the storage part 3 (S305). Herein, if the paper document is normally scanned to acquire the document image, but the user can judge by visual inspection that the description of a part of the attribute information is erroneously recognized, for example, the control part 2 saves the document image and the identification information in the storage part 3 (YES), and accepts the modified input of the attribute information by the user on the UI part 6 (S306). If the modified input of the attribute information is made at S306, the control part 2 stores the attribute information associated with the identification information at S308. Also, if the user can judge by visual inspection that the paper document is not normally scanned (NO), such as when the folded paper document is scanned, for example, the control part 2 controls the UI part 6 to accept the input of deleting the document image and the identification information (S307). Though the above flow is one for the re-input accepting process with the reacquisition support sheet indicating the scan status for one paper document, if another reacquisition support sheet exists, the same process is repeated.

The process implemented by the paper document processing apparatus 1 of this embodiment has been described above. In the above embodiment, the partial execution part 25 performs at least a part of the second recognition process for the document image for which the acquisition result evaluation part 24 evaluates to be negative and stores the execution result in the storage part 3, the attribute information reacquisition part 29 calls the execution result from the storage part 3 to acquire the attribute information generated through the second recognition process. In the following, a modification of the process performed by the paper document processing apparatus 1 will be described below. In this modification, the partial execution part 25 performs at least a part of the second recognition process for the document image for which the acquisition result evaluation part 24 evaluates to be negative, and forms the information indicating the execution result on the reacquisition support sheet for output, and the attribute information reacquisition part 29 acquires the execution result from the reacquisition support sheet to acquire the attribute information generated through the second recognition process.

Figure 4:
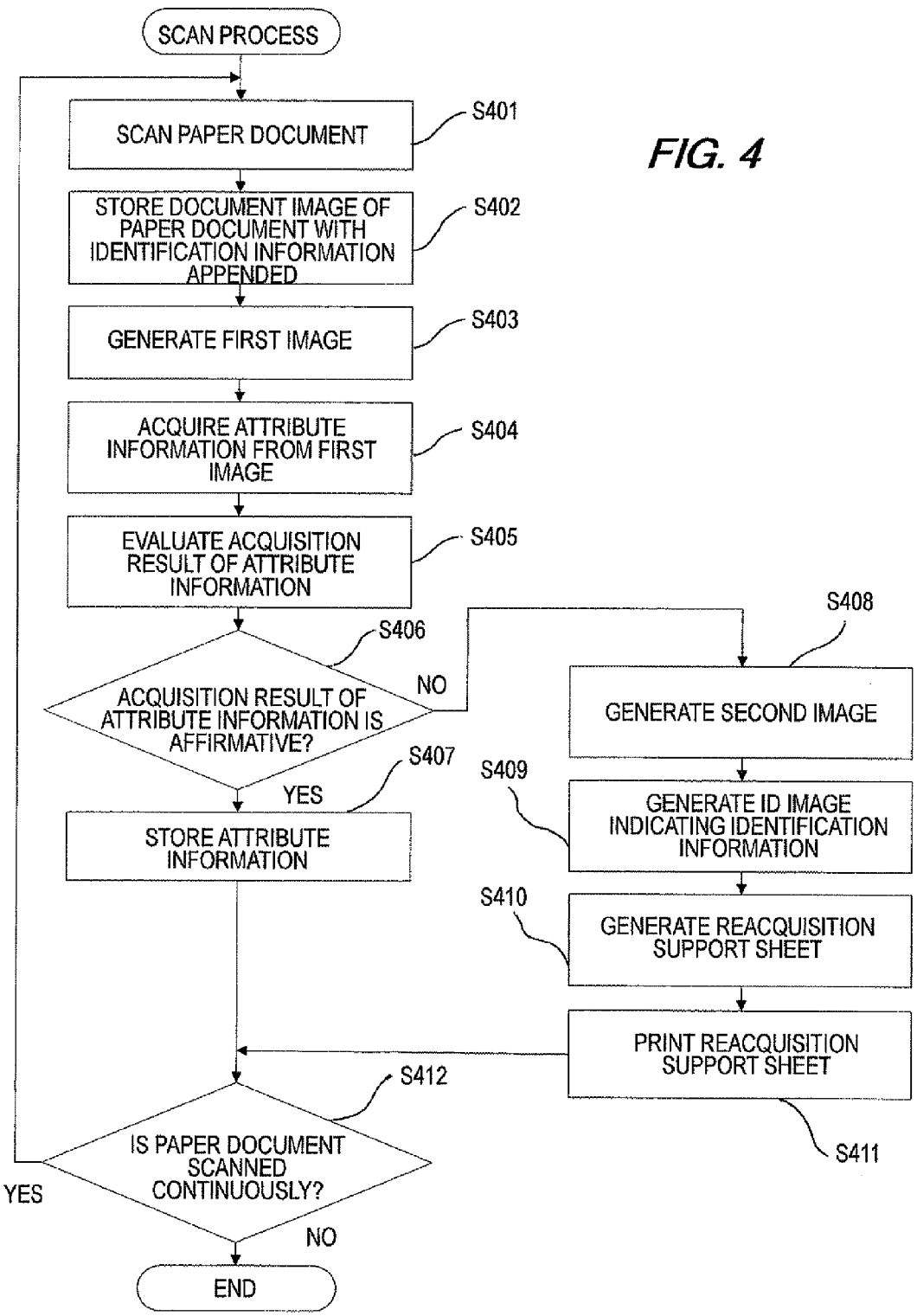
FIG. 4 is a flowchart showing a modification of the flow of the scan process for scanning the paper documents existing in large quantities to issue the reacquisition support sheet.

FIG. 4 is a flowchart showing a modification of the flow of the scan process for scanning various kinds of paper documents existing in large quantities to issue the reacquisition support sheet. The flow (FIG. 4) of this modification and the flow (FIG. 2) of the above scan process are identical, except that the flow (FIG. 4) of the modification does not have the steps corresponding to step S208 of acquiring the attribute information from the generated second image and step S209 of storing the acquired attribute information.

Figure 5:
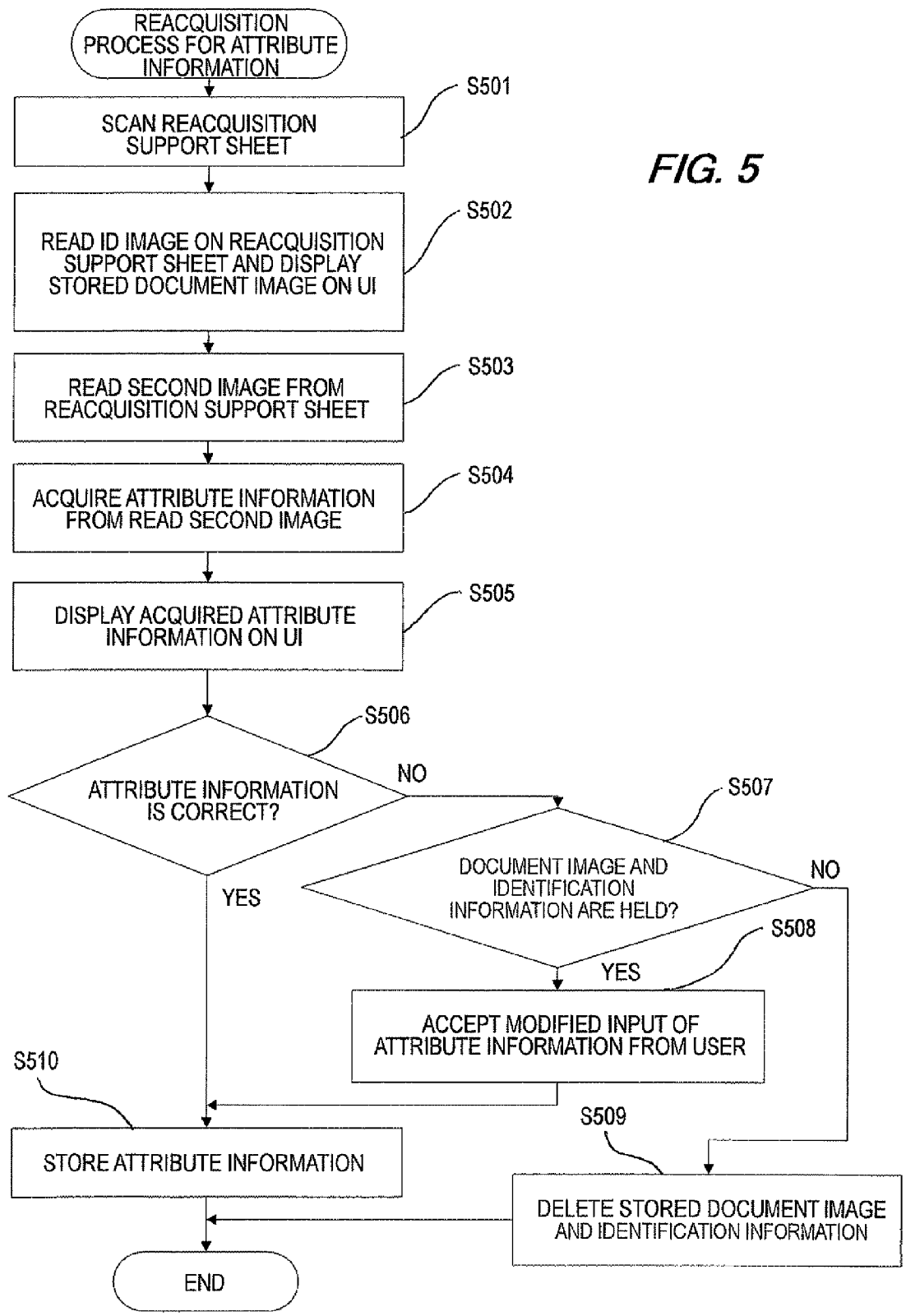
FIG. 5 is a flowchart showing a modification of the flow of the re-input acceptance process for enabling the user to re-input the attribute information in accordance with the issued reacquisition support sheet.

FIG. 5 is a flowchart showing a modification of the flow of the process for reacquiring the attribute information in accordance with the issued reacquisition support sheet. A difference between the flow (FIG. 5) of this modification and the flow (FIG. 3) of the process for reacquiring the attribute information in this embodiment is that the flow (FIG. 3) of the above embodiment does not have the steps corresponding to step S503 of reading the second image from the reacquisition support sheet and step S504 of acquiring the attribute information from the read second image. Also, in the flow (FIG. 5) of the modification, the control part 2 displays the attribute information acquired at S504 on the UI part 6 at S505, whereas in the flow (FIG. 3) of the above embodiment, the control part 2 inquires the attribute information associated with the document image from the storage part 3 in accordance with the identification information indicated by the ID image described on the reacquisition support sheet and displays it on the UI part 6 at S303. Except for these points, the flow (FIG. 5) of the modification and the flow (FIG. 3) of the above embodiment are identical.

Though in the above embodiment and the modification, the document image and the attribute information are associated with the identification information of the document image, the attribute information may be associated with the document image itself. Also, though the medium output part 26 specifies the document image and forms the ID image indicating the identification information such as the QR code and the document image as the information indicating the scan status on the medium, it may specify the document image and form only the document image, the first image or the second image as the information indicating the scan status on the medium.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention defined by the following claims and their equivalents.

What is claimed is:

1. A paper document processing apparatus comprising:
   a document image acceptance unit that accepts a document image acquired by scanning a paper document;
   a document image recording unit that records the document image and identification information in a storage, the identification information relating to the document image;
   an attribute information acquisition unit that acquires attribute information written in letters on the paper document by a first recognition method from a first image generated by a first image process performed on the document image;
   an acquisition result evaluation unit that evaluates whether an acquisition result of the attribute information acquired by the attribute information acquisition unit is affirmative or negative;
   a partial execution unit that, at a point in time when the acquisition result is negative, acquires attribute information by a second recognition method from a second image generated by a second image process performed on the first image, wherein the second recognition method is different from the first recognition method and the second image process generates the second image through the processing of information displayed in the first image;
   a medium output unit that outputs a medium on which the identification information and the second image are printed;
   a medium acceptance unit that accepts the identification information and second image printed on the medium by scanning the medium; and
   an attribute information reacquisition unit that reacquires the attribute information of the paper document from the second image scanned by the medium acceptance unit.

2. The paper document processing apparatus as claimed in claim 1, further comprising:
   an execution result evaluation unit that evaluates whether an execution result of the attribute information acquired by the partial execution unit is affirmative or negative.

3. The paper document processing apparatus as claimed in claim 2,
   wherein
   the medium outputted by the medium output unit indicates the execution result of the partial execution unit, and
   the attribute information reacquisition unit acquires the execution result indicated by the medium.

4. The paper document processing apparatus as claimed in claim 2, further comprising:
   an execution result recording unit that records the execution result of the partial execution unit in the storage.

5. The paper document processing apparatus as claimed in claim 1,
   wherein
   the first image process generates the first image by removing information displayed in the document image.

6. A paper document processing method comprising:
   accepting a document image acquired by scanning a paper document;
   recording the accepted document image and identification information in a storage, the identification information relating to the document image;
   acquiring attribute information written in letters on the paper document by a first recognition method from a first image generated by a first image process performed on the document image;
   evaluating whether an acquisition result of the acquired attribute information from the first image is affirmative or negative;
   at a point in time when the acquisition result is evaluated negative:
     acquiring attribute information by a second recognition method from a second image generated by a second image process performed on the first image, wherein the second recognition method is different from the first recognition method and the second image process generates the second image through the processing of information displayed in the first image;
     outputting a medium on which the identification information and a second image are printed;
     accepting the identification information and second image printed on the medium by scanning the medium; and
     reacquiring the attribute information of the paper document from the second image printed on the medium.

7. The paper document processing method as claimed in claim 6,
   wherein
   the first image process generates the first image by removing information displayed in the document image.

8. The paper document processing method as claimed in claim 6, further comprising:
   evaluating whether an execution result of the attribute information reacquired from the second image is affirmative or negative.

9. A non-transitory computer readable medium storing a program causing a computer to execute a process for reading images of various kinds of paper documents existing in large quantities, the process comprising:
   accepting a document image acquired by scanning a paper document;
   recording the accepted document image and identification information in a storage, the identification information relating to the document image;
   acquiring attribute information written in letters on the paper document by a first recognition method from a first image generated by a first image process performed on the document image;
   evaluating whether an acquisition result of the acquired attribute information from the first image is affirmative or negative;
   at a point in time when the acquisition result is evaluated negative:
     acquiring attribute information by a second recognition method from a second image generated by a second image process performed on the first image, wherein the second recognition method is different from the first recognition method and the second image process generates the second image through the processing of information displayed in the first image;
     outputting a medium on which the identification information and a second image are printed;
     accepting the identification information and second image printed on the medium by scanning the medium; and
     reacquiring the attribute information of the paper document from the second image printed on the medium.

10. The non-transitory computer readable medium as claimed in claim 9, wherein
the first image process generates the first image by removing information displayed in the document image.

11. The non-transitory computer readable medium as claimed in claim 9, wherein the process further comprises:
evaluating whether an execution result of the attribute information reacquired from the second image is affirmative or negative.

* * * * *